Sept. 4, 1973 J. KONECNY ET AL 3,756,902
THERMAL INSULATION FOR FLAT OR TUBULAR STRUCTURAL ELEMENTS
Filed Feb. 16, 1971 3 Sheets-Sheet 1

Inventors:
Jan Konecny
Jan Tomas Haas

By Karl G. Ross
Attorney

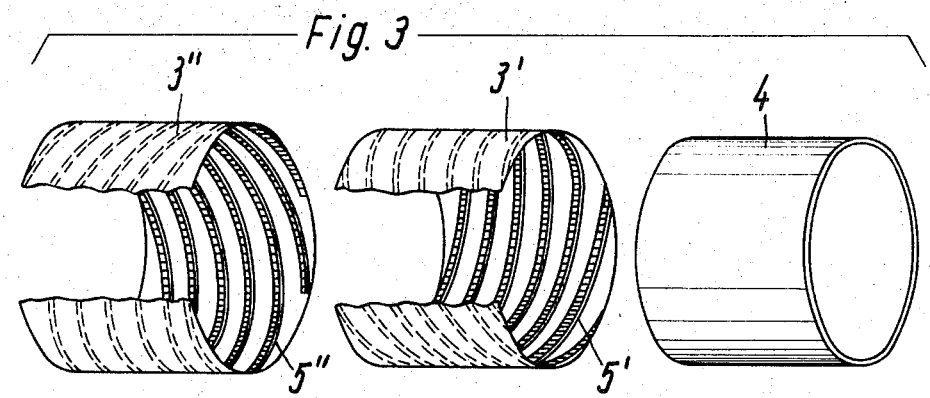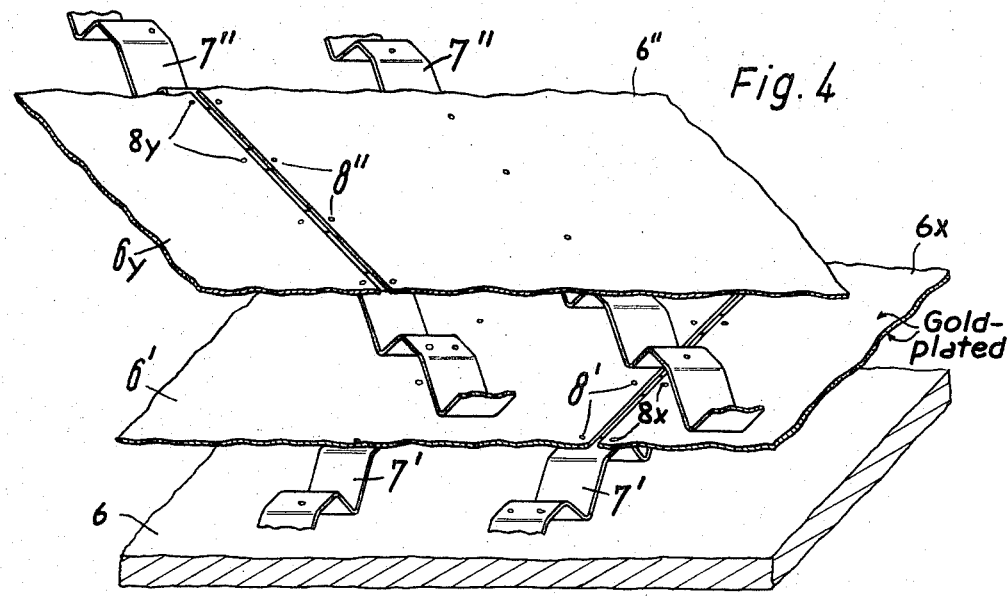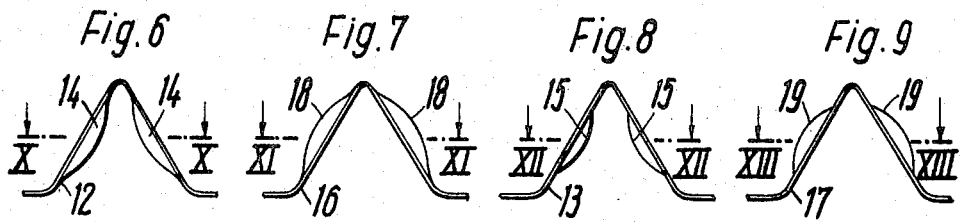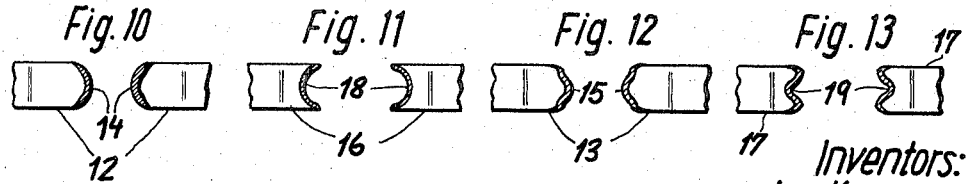

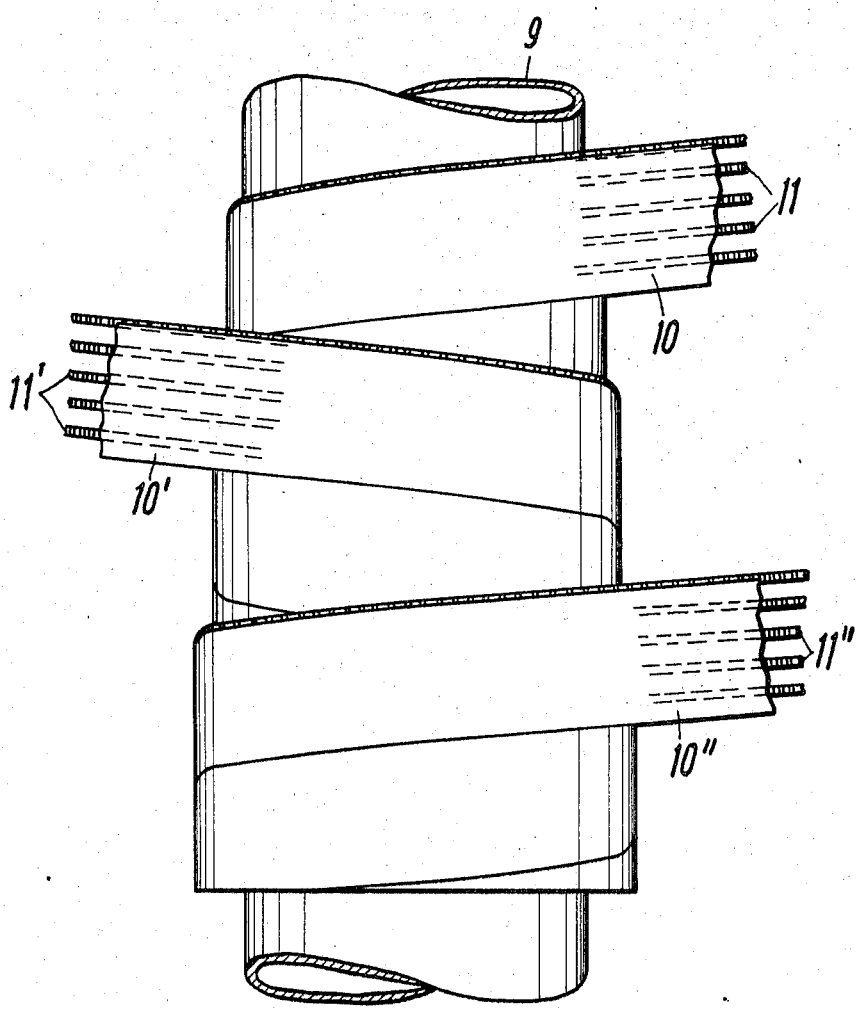

3,756,902
THERMAL INSULATION FOR FLAT OR TUBULAR STRUCTURAL ELEMENTS
Jan Konecny, Buxtehude, and Jan Tomas Haas, Hamburg, Germany, assignors to Hamburger Flugzeugbau G.m.b.H., Hamburg, Germany
Filed Feb. 16, 1971, Ser. No. 115,372
Claims priority, application Germany, Feb. 24, 1970, P 20 08 455.3
Int. Cl. B32b 3/12, 3/30; E04c 2/32
U.S. Cl. 161—39
9 Claims

ABSTRACT OF THE DISCLOSURE

A body to be thermally insulated from its surroundings, such as an instrument housing or a duct, has its exposed surface shielded by one or more foils of metal or polymeric material separated from that surface, and possibly from one another, by transversely spaced undulating profiles with flattened bases on one side and rounded crests of small radius of curvature on the other side. The flattened bases serve for the mounting of the profiles on the foil or foils whereas the rounded crests minimize the area of contact between the insulation and the protected surface.

---

Our present invention relates to a protective covering for thermally insulating an instrument housing, a duct or any other body which is to be shielded from high or low temperatures.

The general object of our invention is to provide a covering of this nature which is of light weight and small bulk and which affords the desired thermal insulation by providing an almost continuous air cushion adjacent an exposed surface of the body to be protected.

A more specific object is to provide a covering of this type adapted to be used on both stationary and mobile structural elements without appreciably increasing their overall dimensions.

These objects are realized, in conformity with the present invention, by the provision of at least one foil which is substantially coextensive with the exposed surface to be shielded and is separated from that surface by a plurality of transversely spaced undulating elongate strips, referred to hereinafter as profiles bearing upon that surface by the crests of their undulations. For greater thermal protection, one or more additional foils may be juxtaposed with the first foil and separated therefrom, as well as from one another, by similar profiles preferably oriented in the same manner, i.e. with their crests bearing upon the foils nearer to the protected body.

In an advantageous embodiment, the undulations of the profiles form flattened bases which lie next to the foil and by which the latter may be conveniently secured to the profiles, possibly with interposition of inserts of low thermal conductivity if, for structural reasons, the profiles consists of a more highly heat-conductive metal. In the presence of a second foil, the two sets of profiles disposed in the intervening spaces may be arranged to extend in mutually intersecting directions so that the outer set comes to rest not only on the inner foil but also on the inner profiles supporting the latter.

The crests of the undulations remote from the associated foil should be curved about a small radius so as to provide only limited contact between the profiles and the protected surface or any intervening foil. The diverging legs of the undulations may be provided with ribs, bends or other stiffening formations to increase the rigidity of the profiles, if necessary.

The foil or foils may consists of a variety of materials including metals (particularly light metals) and synthetic resins or other sheet-forming polymers. Advantageously, these foils are clad on one or preferably both sides with a heat-reflecting facing such as a coating of high-purity gold.

The above and other features of our invention will be described in greater detail hereinafter with reference to the accompanying drawing in which:

FIG. 3 is an exploded perspective view of a tubular body and of an associated two-layer covering according to the invention;

FIG. 4 is a similar exploded view of a flat body and of an associated two-layer covering therefor;

FIG. 5 is an elevational view of another tubular body provided with a multilayer covering according to the invention;

FIGS 6–9 are fragmentary lateral views of various undulations for profiles to be used in the protective coverings shown in preceding figures; and FIGS. 10–13 are cross-sectional views respectively taken on the lines X—X, XI—XI, XII—XII and XIII—XIII of FIGS. 6–9.

Figure 1:
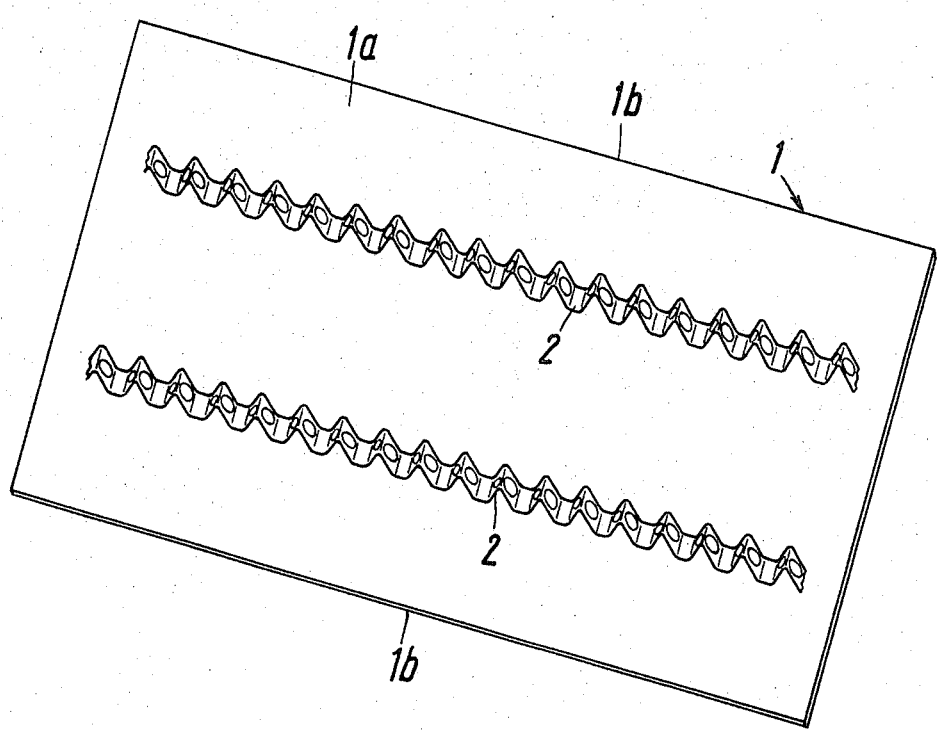
FIG. 1 is an overall perspective view of a protective convering according to our invention, designed for flat bodies.

In FIG. 1 we have shown a composite heat-insulating covering for a flat body (similar to that shown at 6 in FIG. 4) which comprises a foil 1, of any of the materials referred to above, carrying a pair of parallel undulating profiles 2 which rise from a surface $1a$ of the foil and extend parallel to the major sides of its rectangular outline. The profiles 2 may be formed from flat stock on strips of a variety of materials, e.g. sheet metals or plastics, and should extend over nearly the full length of the foil so as to give it proper support. Naturally, the number and relative spacing of the profiles may be varied according to requirements, depending inter alia on the stiffness of the foil and the presence or absence of any load carried on the opposite foil surface.

Figure 2:
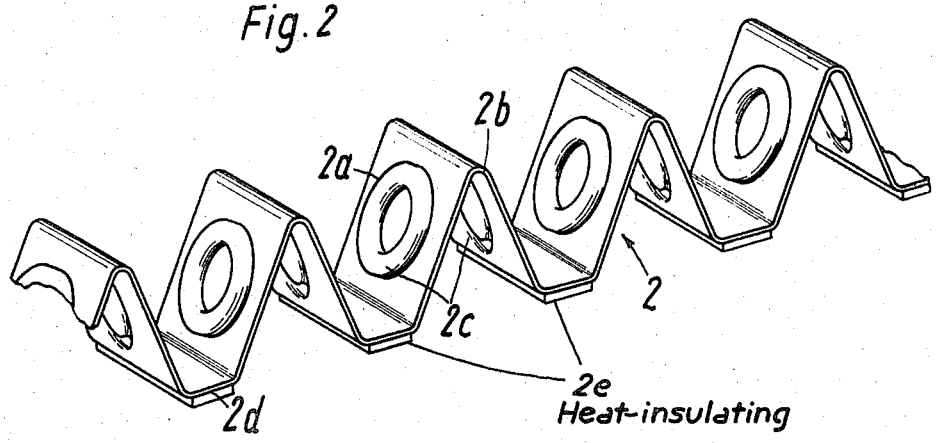
FIG. 2 is an enlarged perspective view of a portion of an undulating profile forming part of the covering of FIG. 1.

FIG. 2 shows one of the profiles 2 in greater detail. Each undulation of the profile is formed by a pair of outwardly diverging sides $2a$ interconnected by a flat portion $2d$ proximal to the foil 1 of FIG. 1, the legs $2a$ of adjacent undulations forming crests $2b$ with a small radius of curvature, which makes them narrower than the bases $2d$. At $2c$ we have indicated rib-like formations which serve to stiffen the legs $2a$ against compressive forces transverse to the foil surface; these stiffening formations could also have any of the shapes described hereinafter with reference to FIGS. 6–13.

As further illustrated in FIG. 2, inserts $2e$ (e.g. pads of cellular resinous or ceramic material) of low thermal conductivity may be laminated onto the flattened bases $2d$ to separate them from the foil 1 when the profile 2 is attached to that foil by cementing, riveting or other means.

FIG. 3 shows a tubular body 4, such as part of a conduit for liquids or gases, whose outer surface is to be thermally shielded by a surrounding envelope comprising an inner foil 3' and an outer foil 3'' on their inner surfaces with respective profiles 5' and 5'' of the type described above. It will be noted that the two sets of profiles, each of which may be a turn of a continuous helical web, are inclined with opposite pitch so that their directions intersect when the inner foil 3' is sandwiched between the body 4 and the outer foil 3''. Thus, profiles 5' rest directly on the exposed surface of body 4 whereas the profiles 5'' bear upon that surface through the intermediary of foil 3' and profiles 5'.

It will also be apparent that the crests 2b (as shown in FIG. 2) of the undulated profiles 5' and 5" point toward the center of curvature thereof.

FIG. 4 illustrates a similar composite covering for a flat body 6, this covering comprising a pair of parallel foils 6', 6" separated from each other and from the body 6 by respective sets of webs 7' and 7". The webs 7' are fastened to foil 6', at their bases 2d (see FIG. 2), by spot-welds 8'; in an analogous manner the webs 7" are fastened to foil 6" by spot-welds 8". As indicated at 8x and 8y, such spot-welds may also be used to extend the foils 6' and 6" by attaching additional sheets 6x and 6y to a web 7' or 7" extending along a common edge thereof. FIG. 4 also shows that the upper and lower surfaces of each foil (as particularly indicated for extension 6x) may be gold-plated to provide heat-reflecting facings; the gold layer may or may not be highly polished.

In FIG. 5 we have shown another tubular body 9 enveloped by a protective covering in the form of three strip-like foils 10, 10', 10" successively coiled thereabout with alternate pitch, each strip 10 carrying a set of profiled webs 11, 11', 11" of undulating shape parallel to its major edges.

Naturally, the tubes shown in FIGS. 3 and 5 need not be circular in cross-section but could also be elliptically or otherwise shaped.

FIGS. 6 and 10 show part of a profile 12 with undulations reinforced by depressions 14 in their inclined legs. According to FIGS. 7 and 11, a profile 16 may have outwardly bulging formations 18 for a like purpose. FIGS. 8 and 12 show a profile 13 with narrower ribs 15 facing inwardly like the depressions 14 of FIGS. 6 and 10; a profile 17 shown in FIGS. 9 and 13 has ribs 19 facing outwardly like the bulges 18 of FIGS. 7 and 11.

It will be noted that the stiffening formations of FIGS. 6–13, like those shown at 2c in FIG. 2, are all spaced from both the broad bases 2d and the narrow crests 2b of the undulations.

If, e.g. as shown in FIGS. 3–5, two or more layers are used to envelop or shield a protected body, the profiles of the several layers need not be of the same height; the dimensioning of these profiles may therefore be freely chosen in accordance with existing structural and thermal requirements.

The protective covering described and illustrated may also be used for sound-damping purposes.

In some instances (as where the parts are to be interconnected by spot welding) it will be convenient to use similar metallic materials for both the foils and the profiles, such as soft aluminum alloys for the former and hard aluminum alloys (e.g. Duralumin) for the latter. Suitable foils of plastic materials include, glass-fiber-reinforced epoxy and polyester sheets.

We claim:

1. A protective covering for a surface of an element to be thermally insulated, comprising at least one foil substantially coextensive with said surface and provided, on its side confronting said surface, with a set of transversely spaced undulating elongate strips whose undulations form flattened bases fastened to said foil and crests subtantially narrower than said bases adapted to bear upon said surface.

2. A covering as defined in claim 1 wherein said strips are provided with inserts of low thermal conductivity interposed between said bases and said foils.

3. A covering as defined in claim 1 wherein said undulations have legs diverging from said bases toward said crests, said legs being provided with stiffening formations spaced from said bases and said crests.

4. A covering as defined in claim 1, comprising at least one other foil separated from the first foil by another set of undulating strips.

5. A covering as defined in claim 4 wherein the two sets of strips extend in mutually intersecting directions.

6. A covering as defined in claim 1 wherein said foil is provided on opposite sides with heat-reflecting facings.

7. A covering as defined in claim 6 wherein said facings consist of gold.

8. A covering as defined in claim 1 wherein said bases and crests alternate in the longitudinal direction of the strips.

9. A covering as defined in claim 8 wherein said foil and said strips consist of sufficiently flexible sheet material to enable a cylindrical bending thereof with curving of said strips and with said crests pointing toward the center of curvature.

References Cited

UNITED STATES PATENTS

| | | | |
|---|---|---|---|
| 3,037,592 | 6/1962 | Shipley et al. | 161—136 X |
| 2,963,128 | 12/1960 | Rapp | 161—133 |
| 3,130,112 | 4/1964 | Anderson, Jr. | 161—133 X |
| 2,190,490 | 2/1940 | Sendzimir | 161—135 X |
| 2,608,720 | 9/1952 | Meissner | 161—135 X |
| 2,209,828 | 7/1940 | Puzio | 161—136 X |
| 3,445,322 | 5/1969 | Saiia et al. | 161—133 X |
| 2,029,370 | 2/1936 | Heldenbrand | 5—351 |
| 2,196,781 | 4/1940 | Saino et al. | 52—618 |
| 2,514,170 | 7/1950 | Walter et al. | 52—618 X |
| 1,802,522 | 4/1931 | Moll | 161—137 X |
| 3,472,728 | 10/1969 | Hitch | 52—618 X |

PHILIP DIER, Primary Examiner

U.S. Cl. X.R.

52—618; 138—148; 161—137